US012780210B2

(12) United States Patent
Jansen et al.

(10) Patent No.: US 12,780,210 B2
(45) Date of Patent: Nov. 3, 2026

(54) METHOD FOR MANOEUVRING A VEHICLE ON A MULTI-LANE ROAD WITH DETERMINATION OF A STARTING POINT OF A DECELERATION LANE, AND DRIVER ASSISTANCE SYSTEM

(71) Applicant: Bayerische Motoren Werke Aktiengesellschaft, Munich (DE)

(72) Inventors: Axel Jansen, Unterschleissheim (DE); Stephan Niermann, Hebertshausen (DE); Julius Schulz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 12 days.

(21) Appl. No.: 18/862,203

(22) PCT Filed: Apr. 21, 2023

(86) PCT No.: PCT/EP2023/060425
§ 371 (c)(1),
(2) Date: Nov. 1, 2024

(87) PCT Pub. No.: WO2023/213566
PCT Pub. Date: Nov. 9, 2023

(65) Prior Publication Data

US 2025/0296568 A1 Sep. 25, 2025

(30) Foreign Application Priority Data

May 5, 2022 (DE) ..................... 10 2022 111 125.3

(51) Int. Cl.
*B60W 30/18* (2012.01)
*B60W 10/20* (2006.01)
*B60W 50/00* (2006.01)

(52) U.S. Cl.
CPC ...... *B60W 30/18163* (2013.01); *B60W 10/20* (2013.01); *B60W 2050/0025* (2013.01); *B60W 2554/406* (2020.02)

(58) Field of Classification Search
CPC ....... B60W 30/18163; B60W 2556/50; B60W 2555/60; B60W 2554/406; B60W 50/14;
(Continued)

(56) References Cited

U.S. PATENT DOCUMENTS

2017/0320521 A1 11/2017 Fujita
2018/0225530 A1* 8/2018 Kunze .................. G06V 20/588
(Continued)

FOREIGN PATENT DOCUMENTS

CN 107077791 A 8/2017
CN 108460980 A 8/2018
(Continued)

OTHER PUBLICATIONS

International Search Report (PCT/ISA/210) issued in PCT Application No. PCT/EP2023/060425 dated Aug. 29, 2023 with English translation (7 pages).
(Continued)

*Primary Examiner* — Erin M Piateski
*Assistant Examiner* — John C Merino
(74) *Attorney, Agent, or Firm* — Crowell & Moring LLP

(57) ABSTRACT

A method for maneuvering a vehicle on a multi-lane road includes receiving a navigation command for carrying out a lane change maneuver from a second traffic lane of the road via a first traffic lane of a road to a deceleration lane of the road; determining a distance between the vehicle and a starting point of the deceleration lane, wherein the distance is determined using sensor data from an environment sensor and/or using digital map data; preparing the lane change maneuver from the second traffic lane to the first traffic lane
(Continued)

depending on the distance; detecting a road sign indicating a distance to the exit; determining a piece of distance information indicated by the road sign; and determining the distance between the vehicle and the starting point of the deceleration lane in addition depending on the distance information.

10 Claims, 2 Drawing Sheets

(58) Field of Classification Search
CPC ......... B60W 2050/143; B62D 15/0255; G01C 21/3602; G01C 21/3658; G06V 20/588; G08G 1/167
See application file for complete search history.

(56) References Cited

U.S. PATENT DOCUMENTS

| | | | | |
|---|---|---|---|---|
| 2019/0152525 | A1 | 5/2019 | Resch | |
| 2020/0217685 | A1* | 7/2020 | Koh | G01C 21/3602 |

FOREIGN PATENT DOCUMENTS

| | | | |
|---|---|---|---|
| DE | 10 2015 209 671 | A1 | 12/2016 |
| DE | 10 2016 216 134 | A1 | 3/2018 |
| DE | 10 2016 216 135 | A1 | 3/2018 |
| DE | 10 2021 003 682 | A1 | 9/2021 |
| DE | 10 2020 117 158 | A1 | 12/2021 |
| DE | 10 2020 117 159 | A1 | 12/2021 |
| DE | 10 2020 117 161 | A1 | 12/2021 |

OTHER PUBLICATIONS

German-language Written Opinion (PCT/ISA/237) issued in PCT Application No. PCT/EP2023/060425 dated Aug. 29, 2023 with English translation (9 pages).
German-language Search Report issued in German Application No. 10 2022 111 125.3 dated Jan. 5, 2023 with partial English translation (16 pages).

* cited by examiner

METHOD FOR MANOEUVRING A VEHICLE ON A MULTI-LANE ROAD WITH DETERMINATION OF A STARTING POINT OF A DECELERATION LANE, AND DRIVER ASSISTANCE SYSTEM

BACKGROUND AND SUMMARY

The present invention relates to a method for maneuvering a vehicle on a multi-lane road. In addition, the present invention relates to a driver assistance system for a vehicle.

Driver assistance systems for carrying out at least partially automated lane change maneuvers or so-called lane change assistance systems are known from the prior art. In these driver assistance systems with an automated or automatic lane change function, the user or driver typically indicates a desired lane change by a specific operating action. If such an operating action is identified, the driver assistance system is used to maneuver the vehicle along a planned trajectory to the adjacent lane or the target lane with automated lateral guidance and generally also with automated longitudinal guidance. In the case of such driver assistance systems or lane change assistance systems, the driver's lane change request is usually signaled by actuating a corresponding operating element, for example a turn signal lever, for activating turn signals that are visible outside the vehicle.

Known driver assistance systems or lane change assistance systems generally monitor the environment of the vehicle before the lane change maneuver using a suitable environmental sensor system. In response to the operating action of the user, it is possible to change lane if a free gap for the driver's own vehicle was identified in the adjacent lane.

In addition, driver assistance systems which assist the user of the vehicle on a multi-lane road upon reaching an exit or a junction are known from the prior art. In this case, on account of a navigation destination being input for example, the driver assistance system can prepare for all necessary lane changes until an exit is reached. For this purpose, the driver assistance system can first of all identify a free gap for the vehicle in the adjacent lane and can then adapt the speed of the vehicle for the subsequent lane change maneuver into the identified gap. The lane change maneuver itself can be carried out by a lane change assistance system, wherein the lane change assistance system is triggered automatically or after an operating input by the user.

In order to be able to prepare for the respective lane change maneuvers, it is necessary to know the distance between the vehicle and the exit. According to the prior art, this distance is determined on the basis of digital map data and/or sensor data from an environmental sensor, in particular a camera. It is also desirable, in particular, for a starting point of the deceleration lane, which leads to the exit, to be identified. The lane change maneuvers can therefore be planned in such a manner that the lane change maneuver to the deceleration lane can be offered to the user as early as possible. This starting point of the deceleration lane is currently identified by the camera and/or on the basis of digital map data. In this case, there is the problem of the camera being able to capture the starting point only very late on account of a restricted range. In addition, the digital map data may often be inaccurate. Therefore, the function cannot determine the exact point for the lane change, in particular when information is still intended to be output to the user.

An object of the present invention is to show a solution of how a method of the type mentioned at the outset can be improved with regard to preparing for the lane change maneuvers.

This object is achieved, according to the invention, by a method and a driver assistance system having the features according to the present disclosure. Advantageous developments of the present invention are also specified in the present disclosure.

A method according to the invention is used to maneuver a vehicle on a multi-lane road. The method comprises receiving a navigation command to carry out a lane change maneuver from a second lane of the road, via a first lane of a road, to a deceleration lane of the road. The method also comprises determining a distance between the vehicle and a starting point of the deceleration lane, wherein the distance is determined on the basis of sensor data from an environmental sensor and/or on the basis of digital map data. The method also comprises preparing for the lane change maneuver from the second lane to the first lane on the basis of the distance. The method also comprises detecting a road sign which indicates a distance to an exit of the road, and determining distance information indicated by the road sign. The method also comprises additionally determining the distance between the vehicle and the starting point of the deceleration lane on the basis of the distance information.

The method is intended to be used to assist the user or driver of the vehicle when maneuvering the vehicle on a multi-lane road. The multi-lane road may fundamentally be an interstate, a federal highway, an expressway, a freeway-like road or the like. The multi-lane road is preferably a freeway. The road may have, for example, two carriageways each with at least two lanes which are referred to in the present case as a first lane and a second lane. Both the driver's own vehicle and further road users may move in these lanes in a predefined direction of travel. The road may also have further lanes. In this case, the first lane may adjoin an exit or the deceleration lane which leads to the exit. The first lane may then be, for example, the right-hand lane of a freeway.

The driver assistance system of the vehicle can be used to receive the navigation command which describes that the vehicle is intended to be maneuvered from the second lane, via the first lane, to the deceleration lane of the road and from there to the exit of the road. In other words, a lane change from the second lane to the first lane is intended to be carried out first, a lane change from the first lane to the deceleration lane is then intended to be carried out, and finally the vehicle is intended to leave the road via the exit. Furthermore, the vehicle may change from the road to another road via the exit. This may be the case, for example, at a freeway interchange or the like. In principle, the navigation command can be predefined by the route guidance or a navigation system of the vehicle. Alternatively or additionally, the navigation command may be due to a corresponding operating input by the user.

Furthermore, the driver assistance system can be used to prepare for the lane change or the lane change maneuver from the second lane to the first lane and from the first lane to the deceleration lane. For this purpose, corresponding environmental sensors of the driver assistance system or of the vehicle can first of all be used to search for free gaps for the vehicle in the first lane. It is therefore possible to find free gaps between the further road users in the first lane which are suitable for the subsequent lane change maneuver. In this case, the lane change maneuver from the second lane to the first lane can be planned in such a manner that the vehicle can subsequently change to the deceleration lane in good time.

If a free gap has been found, for example, corresponding advice to actuate an operating element or the turn light lever can be output to the user. On account of the actuation of the operating element, the lane change maneuver from the second lane to the first lane can then be triggered or initiated. The same applies to the lane change maneuver from the first lane to the deceleration lane. The respective lane change maneuvers can be carried out automatically or in an automated manner by the driver assistance system or a lane change assistance system.

In order to be able to accordingly prepare for the respective lane change maneuvers, the current speed of the vehicle can be taken into account. In addition, the traffic density or the number of further road users in the first lane and/or the second lane can be taken into account. Provision is also made for the lane change maneuvers to be prepared for or determined on the basis of the distance of the vehicle from the starting point of the deceleration lane. In this case, it is desirable, in particular, for the advice to actuate the operating element from the first lane to the deceleration lane to be output to the driver before or as soon as the vehicle has reached the starting point of the deceleration lane.

In this case, the starting point of the deceleration lane describes the point of the deceleration lane from which the deceleration lane begins, when viewed in the direction of travel of the vehicle. The deceleration lane can also be referred to as a filtering-out lane. The deceleration lane may be to the right of the first lane or the right-hand lane in right-hand traffic, specifically in the region in which the breakdown lane is otherwise located. The solid line which otherwise separates the breakdown lane from the first lane changes its course at the starting point of the deceleration lane. A dashed line is situated in the region of the deceleration lane between the first lane and the deceleration lane.

In this case, the starting point of the deceleration lane is determined on the basis of digital map data and/or using a satellite-based positioning system. It is therefore possible to determine the current position of the vehicle based on the digital map and therefore relative to the starting point of the deceleration lane. Alternatively or additionally, the starting point of the deceleration lane can be determined on the basis of the sensor data from the environmental sensor, in particular a camera.

The present invention now provides for at least one road sign which describes the distance to the exit to also be detected. Provision may also be made for a plurality of road signs which describe the distance to the exit to be detected. The road sign may be, in particular, a distance beacon. The road sign may also be assigned to a sign gantry or a traffic control system.

These road signs or distance beacons may be detected, for example, on the basis of the sensor data from the environmental sensor or the image data from the camera. In addition, distance information describing the distance between the road sign and the exit or a defined reference point of the exit or of the deceleration lane can be determined on the basis of the detected road sign. This distance information is now taken into account according to the invention for determining the distance between the vehicle and the starting point of the deceleration lane. Therefore, it is possible, on the one hand, to compensate for the disadvantage that the digital map data may have a certain inaccuracy. In addition, it is possible to remedy the aspect whereby the starting point of the deceleration lane can be detected by the camera only when it is in the detection range of the camera. Overall, the distance of the vehicle to the starting point of the deceleration lane can therefore be determined more precisely and the respective lane change maneuvers can therefore be better planned.

A length of the deceleration lane is preferably determined on the basis of the digital map data and/or on the basis of a predetermined length. Furthermore, the distance between the vehicle and the starting point is preferably determined on the basis of the length of the deceleration lane. The road sign or the detected distance beacons can describe the distance to the exit or a defined reference point of the exit. In order to be able to determine the position of the starting point of the deceleration lane, the length of the deceleration lane can be determined or estimated. In this case, the length of the deceleration lane can be determined on the basis of the digital map data. Alternatively or additionally, provision may be made for the length of the deceleration lane to be determined on the basis of a predetermined length value or a broad assumption. The predetermined length may be determined on the basis of the region, the road type or the like. The distance between the vehicle and the starting point of the deceleration lane can therefore be determined precisely.

It is also advantageous if the sensor data from the environmental sensor, the digital map data and/or the distance information is/are weighted in order to determine the distance between the vehicle and the starting point of the deceleration lane. These data can each be weighted on the basis of the current accuracy and/or availability. For example, the weighting of the digital map data can be determined on the basis of the accuracy or resolution of the digital map. Furthermore, the weighting of the digital map data can be determined on the basis of the accuracy of the satellite-based positioning system. The weighting of the sensor data may be determined on the basis of the type of environmental sensor or camera. In addition, the sensor data may be weighted on the basis of the visibility conditions, the traffic density or the like. The distance data may be weighted, for example, on the basis of the current region. The respective data can be given a higher weighting, the higher their accuracy for determining the distance between the vehicle and the starting point of the deceleration lane.

It is also advantageous if advice is output to the user of the vehicle in order to prepare for the lane change maneuver, wherein the advice is output before the starting point of the deceleration lane is identified on the basis of the sensor data from the environmental sensor. As explained above, the environmental sensor can preferably be a camera. As explained above, appropriate advice indicating that the lane change maneuver can be carried out can be output to the user. In this case, the advice for the lane change from the first lane to the deceleration lane is output before the starting point of the deceleration lane can be detected by the camera. There is therefore sufficient time for the user to trigger the lane change and to therefore change to the deceleration lane in good time.

According to a further embodiment, the lane change maneuver from the first lane to the deceleration lane is allowed after the starting point of the deceleration lane has been identified on the basis of the sensor data from the environmental sensor. In other words, the lane change maneuver or the activation of the lane change assistant can be suspended until the starting point of the deceleration lane can actually be detected by the camera. It is therefore possible to prevent the lane change maneuver from being carried out early and the solid line, which separates the first lane from a breakdown lane, therefore being crossed.

If the lane change maneuver from the first lane to the deceleration lane can be carried out automatically or in an automated manner by the driver assistance system or the lane change assistance system, a right-hand road marking can be given a higher weighting. For example, the right-hand road marking and the left-hand road marking, which bound the first lane, can be continuously detected on the basis of the sensor data from the environmental sensor or the camera and/or the course of these road markings can be estimated. As soon as the starting point of the deceleration lane is identified, the right-hand lane can be given a higher weighting than the left-hand lane for the lane change maneuver or during lateral control, for example. It is therefore possible to follow this road marking, during lateral control or the lane change maneuver to the deceleration lane, as far as the exit. This can be carried out, in particular, before the deceleration lane is identified as an additional lane. Errors in lateral control, which is oriented to the road markings, can therefore be prevented.

Provision may also be made for a category of the region of the road to the right of the first lane to be changed from “inaccessible” to “accessible” as soon as the starting point of the deceleration lane is identified. This makes it possible to achieve the situation in which the lane change maneuver from the first lane to the deceleration lane is not delayed on account of the assumption of the incorrect category and/or a delayed change in the category. A lane change maneuver across a solid line is nevertheless preferably prevented.

According to a further embodiment, a longitudinal speed of the vehicle is adapted in order to prepare for the lane change maneuver. Provision may therefore be made for a speed or longitudinal speed of the vehicle to be adapted by the driver assistance system in order to prepare for the respective lane change maneuvers. In particular, the speed of the driver’s own vehicle can be reduced or adapted to a speed of the further road users in the first lane. For example, the speed of the vehicle can be adapted in such a manner that a gap in the target lane is tracked.

A driver assistance system according to the invention for a vehicle is configured to carry out a method according to the invention and the advantageous configurations thereof. The driver assistance system may have, in particular, a computing device which can be formed by at least one electronic control unit. In principle, the computing device may have at least one processor and/or a memory.

The driver assistance system may be configured to receive a navigation command to carry out the lane change maneuver from a second lane of the road, via a first lane of the road, to a deceleration lane of the road. In addition, the driver assistance system may be configured to determine a distance between the vehicle and a starting point of the deceleration lane on the basis of sensor data from an environmental sensor and/or on the basis of digital map data. In this case, the environmental sensor may be in the form of a camera, in particular. Image data, in particular, may be received as sensor data from the environmental sensor. In addition, the driver assistance system may have a receiver for a satellite-based positioning system. Furthermore, the driver assistance system may be configured to prepare for the lane change maneuver from the second lane to the first lane on the basis of the distance. For this purpose, the driver assistance system may intervene in the longitudinal guidance of the vehicle if necessary. In addition, the driver assistance system may be configured to detect a road sign, which indicates a distance to an exit of the road, and to determine distance information indicated by the road sign. In addition, the driver assistance system may be configured to additionally determine the distance between the vehicle and the starting point of the deceleration lane on the basis of the distance information.

A vehicle according to the invention comprises a driver assistance system according to the invention. The vehicle is in the form of an automobile, in particular.

The preferred embodiments and their advantages presented with respect to the method according to the invention accordingly apply to the driver assistance system according to the invention and to the vehicle according to the invention.

Further features of the invention emerge from the claims, the figures and the description of the figures. The features and combinations of features mentioned above in the description and the features and combinations of features mentioned below in the description of the figures and/or shown in the figures alone can be used not only in the respectively stated combination, but also in other combinations or alone, without departing from the scope of the invention.

The invention is now explained in more detail using preferred exemplary embodiments and with reference to the accompanying drawings.

DETAILED DESCRIPTION OF THE DRAWINGS

In the figures, identical or functionally identical elements are provided with the same reference signs.

Figure 1:
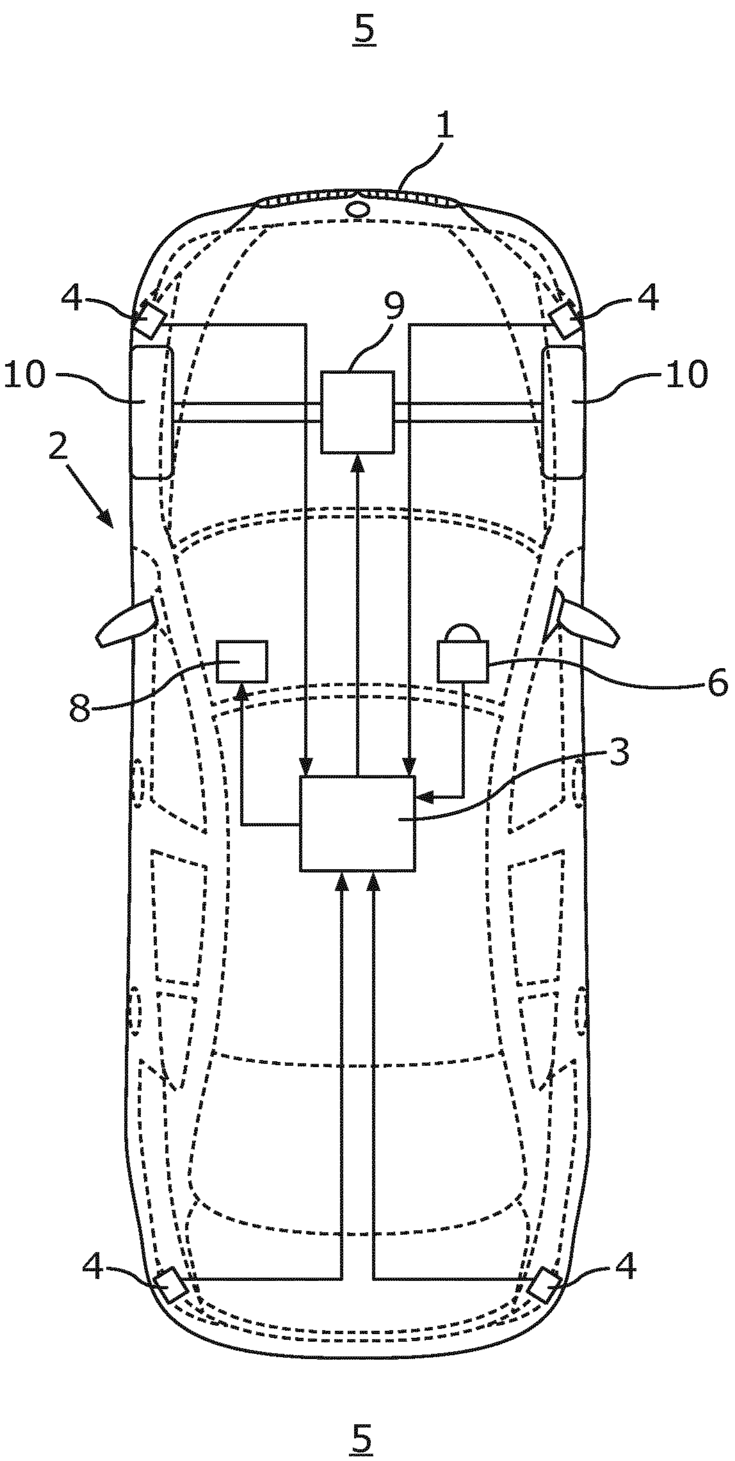
FIG. 1 shows a schematic illustration of a vehicle having a driver assistance system for assisting a user when maneuvering the vehicle on a multi-lane road.

FIG. 1 shows a plan view of a vehicle 1 which is in the form of an automobile in the present case. The vehicle 1 comprises a driver assistance system 2 which can be used to assist a user or driver when maneuvering the vehicle 1 on a multi-lane road 11. The vehicle 1 or the driver assistance system 2 comprises a computing device 3 which can be formed by at least one electronic control unit, for example.

In addition, the driver assistance system 2 comprises first environmental sensors 4 which may be in the form of distance sensors and, in particular, radar sensors. In the present example, the driver assistance system 2 comprises four first environmental sensors 4, two of which are arranged in a front region and two of which are arranged in a rear region of the vehicle 1. In this case, the first environmental sensors 4 are arranged in the respective corners of the vehicle 1. The first environmental sensors 4 can be used to carry out appropriate measurements in order to be able to detect objects and, in particular, further road users 7 in an environment 5 of the vehicle 1. In addition, the driver assistance system 2 comprises a second environmental sensor 6 which is in the form of a camera. Corresponding image data which describe the environment 5 of the vehicle 1 can be provided as sensor data using the second environmental sensor 6 or the camera.

The computing device 3 can be used to control a drive motor and/or a braking system of the vehicle 1 in order to influence longitudinal guidance of the vehicle 1. This makes it possible to prepare for lane change maneuvers by reducing the speed of the vehicle 1. Provision is also made for the computing device 3 to be configured to control a steering system 9 of the vehicle 1, which is only schematically illustrated in the present case. As a result of the control of the steering system, it is possible to take over the lateral guidance of the vehicle 1 during an automated lane change maneuver. As a result of the control of the steering system 9, it is possible to steer the steerable wheels 10 of the vehicle 1 and to therefore take over the lateral guidance during the lane change maneuver. In addition, the driver assistance system 2 comprises an output device 8 which can be used to output advice to the user or driver of the vehicle 1.

Figure 2:
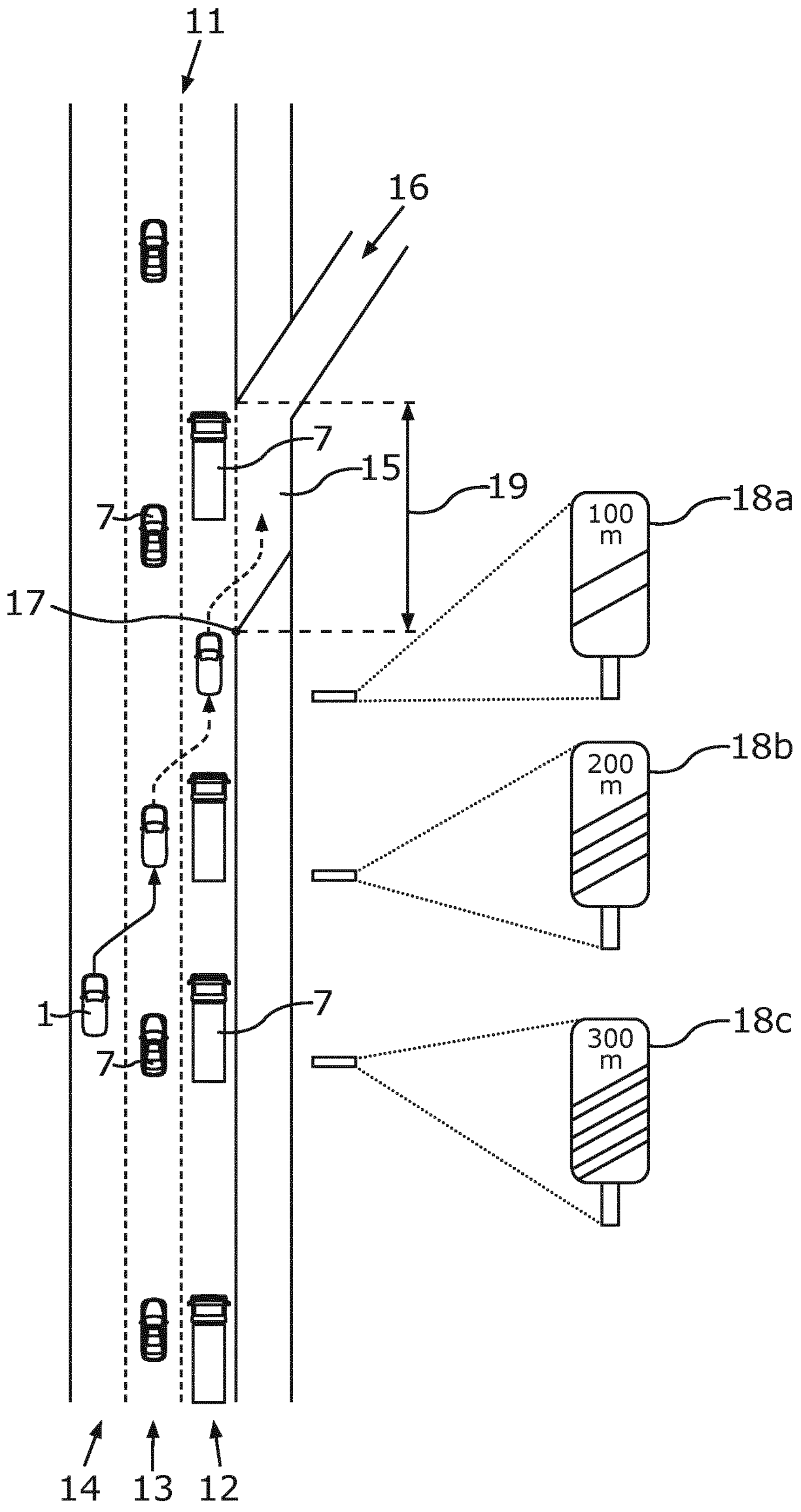
FIG. 2 shows the vehicle according to FIG. 1 which is on a multi-lane road, wherein a driving maneuver from a second lane, via a first lane, to a deceleration lane of the road is planned.

FIG. 2 shows a schematic illustration of a traffic situation in which the vehicle 1 according to FIG. 1 is on a multi-lane road 11. In the present example, the road 11 is in the form of a freeway. In this case, the road 11 comprises a first lane 12 or a right-hand lane, a second lane 13 or a middle lane and a third lane 14 or a left-hand lane. In the example shown, the vehicle 1 is in the third lane 14 or the left-hand lane of the freeway. In this case, the vehicle 1 is intended to be first maneuvered from the third lane 14 to the second lane 13, then to the first lane 12 and then, via a deceleration lane 15, to an exit 16 of the road 11. The vehicle 1 can therefore follow a predefined navigation route, for example.

Provision is also made for automated lane change maneuvers from the third lane 14 to the second lane 13, from the second lane 13 to the first lane 12 and from the first lane 12 to the deceleration lane 15 to be prepared for and then carried out by the driver assistance system 2. In this case, the respective lane change maneuvers can be carried out on the basis of the current speed of the vehicle, the traffic density on the road 11 and/or a predetermined strategy. Provision is also made for the respective lane change maneuvers to be carried out on the basis of a distance of the vehicle 1 to a starting point 17 of the deceleration lane 15. In particular, the respective lane change maneuvers are intended to be carried out in such a manner that it is made possible for the user to carry out a lane change from the first lane 12 to the deceleration lane 15 before or as soon as the vehicle 1 has passed the starting point 17 of the deceleration lane 15.

Digital map data can be used in order to be able to determine the distance between the vehicle 1 and the starting point 17 of the deceleration lane 15. These digital map data can be accordingly either received or stored in a memory of the computing device 3 or the driver assistance system 2. The position of the vehicle 1 relative to the digital map can be determined using a receiver of a satellite-based positioning system, which receiver is not illustrated here. The starting point 17 can also be determined on the basis of the sensor data or image data from the camera 6. In the present case, provision is also made for the distance between the vehicle 1 and the starting point 17 to be determined on the basis of road signs 18*a*, 18*b*, 18*c*. These road signs 18*a*, 18*b*, 18*c* contain distance information describing the distance to the exit 16. In the present case, three distance beacons are detected as road signs 18*a*, 18*b*, 18*c* by the camera 6. In this case, the distance beacon 18*c* is 300 meters away from the exit 16, the distance beacon 18*b* is 200 meters away from the exit 16 and the distance beacon 18*a* is 100 meters away from the exit 16.

The position of the starting point 17 can be determined on the basis of the distance information from the road signs 18*a*, 18*b*, 18*c* or the distance beacons taking into account a length 19 of the deceleration lane 15. The length 19 of the deceleration lane 15 can be determined on the basis of the digital map data or on the basis of a predetermined overall length. The map-based data and the sign-based value can be weighted depending on the quality, for example the accuracy of the satellite-based positioning system, the accuracy of the camera and/or the region. The user can therefore receive the indication of the lane change before the camera 6 actually identifies the starting point. Alternatively or additionally, the vehicle 1 or the driver assistance system 2 can give a right-hand road marking of the first lane 12 a higher weighting when carrying out an automated lane change maneuver. This road marking can therefore be directly followed to the deceleration lane 15 or the exit 16 before it is identified as an additional lane. The lane change maneuver can be suspended if necessary until the starting point 17 is actually identified by the camera 6.

The invention claimed is:

1. A method for maneuvering a vehicle on a multi-lane road comprising:

receiving a navigation command to carry out a lane change maneuver from a second lane of the multi-lane road, via a first lane of the multi-lane road, to a deceleration lane of the multi-lane road;

determining a distance between the vehicle and a starting point of the deceleration lane, wherein the distance is determined on a basis of sensor data from an environmental sensor and/or on a basis of digital map data;

preparing for the lane change maneuver from the second lane to the first lane on a basis of the distance;

detecting a road sign that indicates a distance to an exit of the multi-lane road;

determining distance information indicated by the road sign;

determining a distance between the vehicle and the starting point of the deceleration lane on a basis of the distance information; and automatically performing, in an at least partially automated manner, the lane change maneuver from the second lane to the first lane after the starting point of the deceleration lane has been identified.

2. The method according to claim 1, comprising:

determining a length of the deceleration lane on a basis of the digital map data and/or on a basis of a predetermined length; and determining the distance between the vehicle and the starting point on a basis of the length of the deceleration lane.

3. The method according to claim 1, comprising:

weighting the sensor data from the environmental sensor, the digital map data, and/or the distance information in order to determine the distance between the vehicle and the starting point of the deceleration lane.

4. The method according to claim 1, comprising:

outputting advice to a user of the vehicle in order to prepare for the lane change maneuver, wherein the advice is output before the starting point of the deceleration lane is identified on the basis of the sensor data from the environmental sensor.

5. The method according to claim 1, comprising:

automatically adapting a longitudinal speed of the vehicle in order to prepare for the lane change maneuver.

6. A driver assistance system for a vehicle configured to:

receive a navigation command to carry out a lane change maneuver from a second lane of a multi-lane road, via a first lane of the multi-lane road, to a deceleration lane of the multi-lane road;

determine a distance between the vehicle and a starting point of the deceleration lane on a basis of sensor data from an environmental sensor and/or on a basis of digital map data;

prepare for the lane change maneuver from the second lane to the first lane on a basis of the distance;

detect a road sign that indicates a distance to an exit of the multi-lane road;

determine distance information indicated by the road sign;

determine the distance between the vehicle and the starting point of the deceleration lane on a basis of the distance information; and automatically perform, in an at least partially automated manner, the lane change maneuver from the second lane to the first lane after the starting point of the deceleration lane has been identified.

7. The driver assistance system according to claim 6, wherein the driver assistance system is configured to:

determine a length of the deceleration lane on a basis of the digital map data and/or on a basis of a predetermined length; and determine the distance between the vehicle and the starting point on a basis of the length of the deceleration lane.

8. The driver assistance system according to claim 6, wherein the driver assistance system is configured to:

weight the sensor data from the environmental sensor, the digital map data, and/or the distance information in order to determine the distance between the vehicle and the starting point of the deceleration lane.

9. The driver assistance system according to claim 6, wherein the driver assistance system is configured to:

output advice to a user of the vehicle in order to prepare for the lane change maneuver, wherein the advice is output before the starting point of the deceleration lane is identified on the basis of the sensor data from the environmental sensor.

10. The driver assistance system according to claim 6, wherein the driver assistance system is configured to:

automatically adapt a longitudinal speed of the vehicle in order to prepare for the lane change maneuver.

* * * * *